Aug. 12, 1930.   J. W. COX   1,772,536
CONDUIT FITTING
Filed March 27, 1925
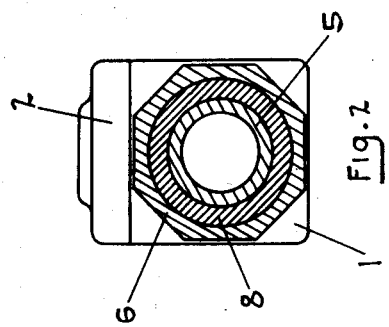
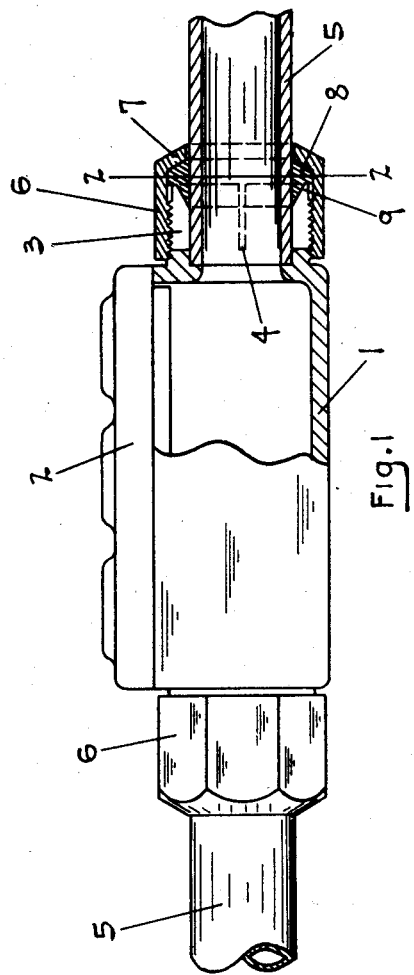

Patented Aug. 12, 1930

1,772,536

UNITED STATES PATENT OFFICE

JOHN WILLIAM COX, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed March 27, 1925. Serial No. 18,802.

This invention is designed to improve conduit fittings, particularly such fittings as are designed to secure threadless conduits. Such fittings ordinarily involve a collapsing feature which is adapted to engage and clamp a conduit and hold the same in the fitting. Ordinarily to form such collapsing features it is necessary to provide them with slits. In any event, ordinarily the fitting is not waterproof. The present invention is designed to make such a fitting waterproof. Features and details of the invention will appear from the specification and claim.

The invention is illustrated in the accompanying drawings as follows:—

Fig. 1 shows a side elevation, partly in section, of the fitting.

Fig. 2 a section on the line 2—2 in Fig. 1.

1 marks the body of the fitting which as exemplified is in the form of a conduit box, 2 a cover for the box, and 3 a conduit receiving extension on the box. The extension is provided with slits 4 extending from its outer end inwardly, thus making it readily contractible. A threadless conduit 5 is arranged in the extension.

The extension is externally screw-threaded and a nut 6 turned on to the extension. The threads of the nut and the threads of the extension are so formed as to contract the extension as the nut is screwed up, thus clamping the inserted conduit 5.

The nut has a flange 7 at its outer end and this is adapted to engage a packing 8. The packing 8 is so crowded by the flange as to pack the joint between the nut and the conduit and between the end of the extension and the conduit, the end of the extension being preferably tapered at 9 to assure a more pronounced clamping or setting of the packing. In order to completely close the slits 4 they preferably terminate in the extension and the nut extends over the extension a sufficient distance to cover the slits. It will be noted that the packing in itself tends to clamp the conduit in place.

What I claim as new is:—

In a conduit fitting, the combination of a body; devices connecting the body with a conduit comprising a contractible axially slotted sleeve; a flanged nut on the sleeve, the flange forming a gasket receiving recess, said nut extending along the sleeve beyond the bottom of the slots; and a gasket between the end of the sleeve and the flange on the nut.

In testimony whereof I have hereunto set my hand.

JOHN WILLIAM COX.